C. HOWARD.
Paddle Mechanism for Boats.
No. 135,710.  Patented Feb. 11, 1873.
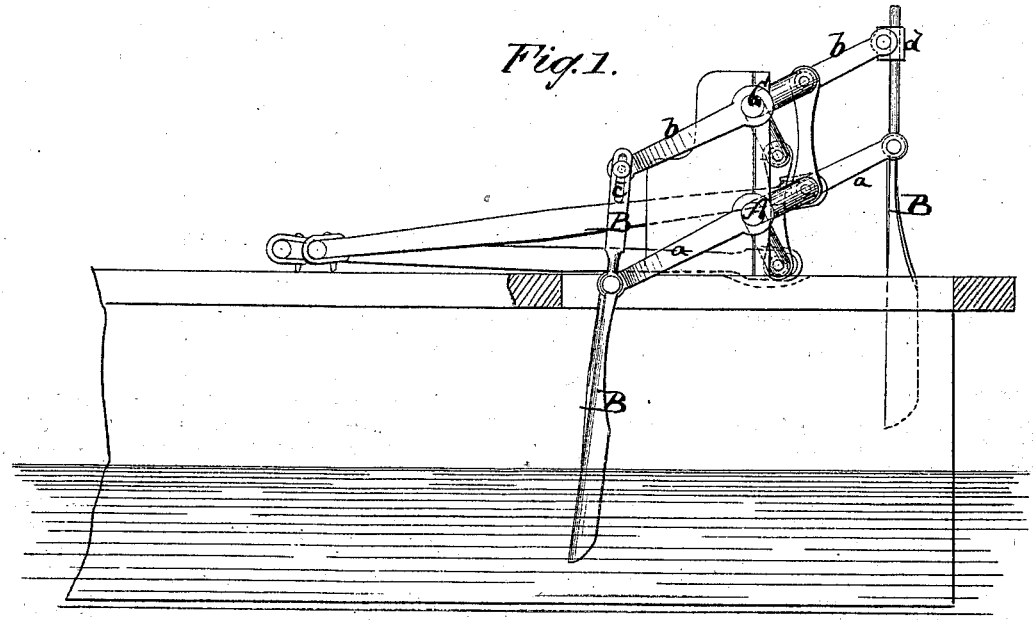
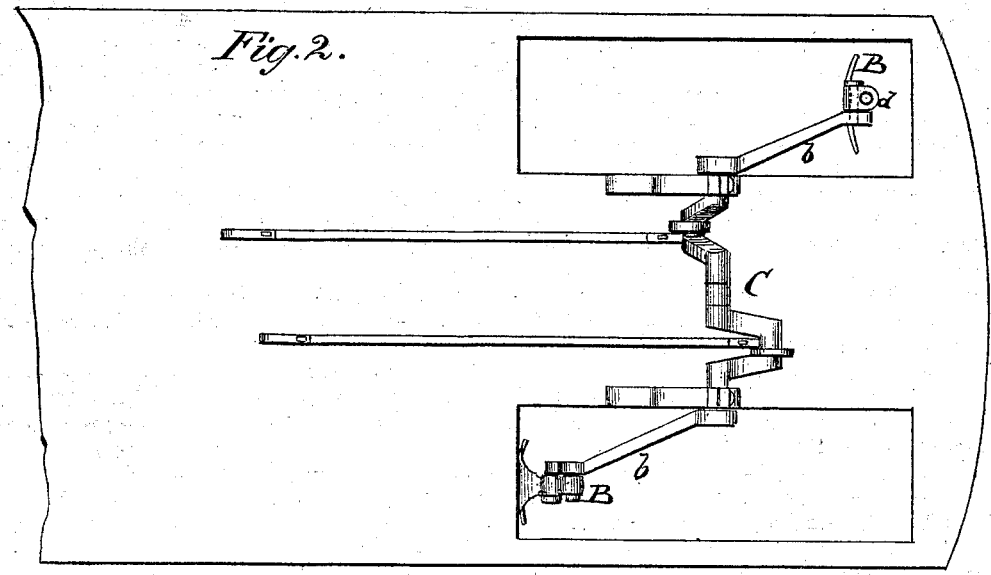

UNITED STATES PATENT OFFICE.

CHARLES HOWARD, OF NEW YORK, N. Y.

IMPROVEMENT IN PADDLE MECHANISMS FOR BOATS.

Specification forming part of Letters Patent No. 135,710, dated February 11, 1873.

*To all whom it may concern:*

Be it known that I, CHARLES HOWARD, of New York, in the county of New York and State of New York, have invented a new and useful Improvement in Paddle Mechanism for Boats, of which the following is a specification:

Figure 1 is a side view, and Fig. 2 a top view of my improvement.

Similar letters of reference indicate corresponding parts.

My invention relates to an improvement on my "improvement in paddle mechanism for boats," which was patented March 19, 1872, No. 124,746. My present improvement consists in attaching the upper end of the paddle B directly to the pin or wrist of the upper or short crank $b$, instead of having an intervening arm or connecting-rod extending from said short crank $b$ to the upper end of the paddle B, as in my aforementioned Letters Patent. The lower or long crank $a$ is, as before, connected to the paddle B near its middle. I obviate the difficulty of working a long crank when thus connected with a short crank by having the upper end of the paddle B made with a vertical slot or slide, $c$, or its equivalent, of sufficient length to enable the pin or wrist of the short crank to slide up and down as the cranks revolve far enough to allow two cranks of different lengths to work when thus connected.

By this improvement I hold the upper end of my paddle firm as against lateral or side pressure, and thus relieve the pin or wrist of the lower crank from its hardest lateral strain. At the same time I dispense altogether with the connecting-arm between the upper end of the paddle and the short crank.

In place of a slot in the upper end of the paddle to allow the paddle to slide up and down on the pin of the short crank, I can produce the same result by making the upper end of the paddle-shank in form of a round or square bar, and having it work in a hole or mortise made through the box or block $d$ that works on the pin or wrist of said short crank. Thus the upper end of the paddle slides up and down through the hole or mortise of the box or block $d$ that works on the wrist or pin of the short crank $b$ a sufficient distance to allow the two cranks to work in the desired manner. In several respects such direct connection of the paddle with the cranks will be of advantage, even when the cranks are not of unequal lengths.

Having thus described my invention, I claim as new and desire to secure by Letters Patent—

The paddle-shank provided with the slot $c$ or equivalent guide, by which the paddle is allowed to slide up and down on the pin or wrist of a crank in such a manner as to allow two cranks, $a\ b$, of different lengths, to be attached to the paddle, substantially as set forth.

CHARLES HOWARD.

Witnesses:
T. B. MOSHER,
ALEX. F. ROBERTS.